United States Patent
Bergman (10) Patent No.: US 9,544,250 B2
(45) Date of Patent: Jan. 10, 2017

(54) ENHANCED ACKNOWLEDGEMENT HANDLING IN COMMUNICATION PACKET TRANSFER

(71) Applicant: Fastly Inc., San Francisco, CA (US)

(72) Inventor: Artur Bergman, San Francisco, CA (US)

(73) Assignee: Fastly Inc., San Francisco, CA (US)

( * ) Notice: Subject to any disclaimer, the term of this patent is extended or adjusted under 35 U.S.C. 154(b) by 0 days.

(21) Appl. No.: 14/349,934

(22) PCT Filed: Feb. 26, 2014

(86) PCT No.: PCT/US2014/018612
§ 371 (c)(1),
(2) Date: Apr. 4, 2014

(87) PCT Pub. No.: WO2014/134135
PCT Pub. Date: Sep. 4, 2014

(65) Prior Publication Data
US 2015/0350115 A1    Dec. 3, 2015

Related U.S. Application Data

(60) Provisional application No. 61/769,364, filed on Feb. 26, 2013.

(51) Int. Cl.
*H04L 12/26* (2006.01)
*H04L 12/861* (2013.01)
(Continued)

(52) U.S. Cl.
CPC ......... *H04L 49/9094* (2013.01); *G06F 13/385* (2013.01); *H04L 1/1607* (2013.01); *H04L 1/188* (2013.01)

(58) Field of Classification Search
CPC ...... H04L 45/74; H04L 67/02; H04L 67/2842; H04L 67/2847; H04L 67/306; H04L 45/00; H04L 45/20; H04L 47/10; H04L 47/17; H04L 47/22; H04L 47/28; H04L 47/32; H04L 29/06; H04L 69/16; H04L 69/22; H04N 21/6175
See application file for complete search history.

(56) References Cited

U.S. PATENT DOCUMENTS 7,392,325 B2 *   6/2008   Grove ............... H04L 29/12066
                                                            709/218
7,418,518 B2 *   8/2008   Grove ............... H04L 29/12066
                                                            709/218
(Continued)

FOREIGN PATENT DOCUMENTS

WO        2009012426 A2     1/2009

OTHER PUBLICATIONS

Bergman, Artur, "Varnish—A State of the Art High-Performance Reverse Proxy", Jul. 20, 2009, OSCON 20009.*
(Continued)

*Primary Examiner* — Brian O'Connor (57) ABSTRACT

Described herein are methods, systems, and software for handling packet buffering between end users and content servers, such as content delivery nodes. In one example, a method of operating a content server includes generating first and second data packets for first and second content requests. Once generated, the method provides storing the first packets in a packet buffer and transferring the first packets to a first user device. Upon transfer, the first packets are deleted from the packet buffer and replaced with the second packets. Theses second packets are then transferred to a second user device and deleted from the packet buffer. Further, once the packets are transferred to the user devices, the method further includes monitoring for an acknowledgment from the user devices to ensure the packets are received.

20 Claims, 6 Drawing Sheets

(51) Int. Cl.
*H04L 1/16* (2006.01)
*H04L 1/18* (2006.01)
*G06F 13/38* (2006.01)

(56) References Cited

U.S. PATENT DOCUMENTS

| | | | |
|---|---|---|---|
| 7,768,919 B1 * | 8/2010 | Conway | H04L 47/10 370/232 |
| 7,873,065 B1 | 1/2011 | Mukerji et al. | |
| 7,911,994 B2 * | 3/2011 | Clarke | H04L 47/19 370/232 |
| 7,957,273 B2 | 6/2011 | Rao et al. | |
| 8,364,812 B2 * | 1/2013 | Loach | H04L 47/17 709/205 |
| 8,761,010 B2 * | 6/2014 | Jinzaki | H04L 47/193 370/229 |
| 8,780,719 B2 * | 7/2014 | Nishimura | H04L 47/10 370/232 |
| 8,812,673 B2 * | 8/2014 | Balachandran | H04L 47/10 709/226 |
| 8,819,109 B1 * | 8/2014 | Krishnamurthy | G06F 17/30905 709/203 |
| 8,990,326 B2 * | 3/2015 | Banks | H04W 4/14 709/206 |
| 9,001,833 B2 * | 4/2015 | Nakatsugawa | H04L 47/30 370/229 |
| 2002/0141448 A1 | 10/2002 | Matsunaga | |
| 2006/0218314 A1 | 9/2006 | Kawabe | |
| 2009/0112742 A1 * | 4/2009 | Sumino | G06Q 20/102 705/30 |
| 2009/0313330 A1 | 12/2009 | Sakamoto | |
| 2011/0252284 A1 | 10/2011 | Sindhu et al. | |
| 2011/0286469 A1 | 11/2011 | Yasuda | |
| 2012/0269071 A1 | 10/2012 | Cohen et al. | |
| 2013/0031060 A1 * | 1/2013 | Lowery | G06F 17/30902 707/689 |

OTHER PUBLICATIONS

Velazquez et al, "Varnish Software: The Varnish Book", 2010-2015, Varnish Software, downloaded on Oct. 5, 2015.*

* cited by examiner

ENHANCED ACKNOWLEDGEMENT HANDLING IN COMMUNICATION PACKET TRANSFER

RELATED APPLICATIONS

This application hereby claims the benefit of and priority to U.S. Provisional Patent Application 61/769,364, titled "ENHANCED ACKNOWLEDGEMENT HANDLING IN COMMUNICATION PACKET TRANSFER", filed Feb. 26, 2013, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers which host network content of content creators or originators, such as web servers for hosting a news website.

Various communication protocols use packetized communications between end points, such as transmission control protocol (TCP), which resides at the transport layer that handles flow control and data transport services for application layers, among other higher network layers. Software for TCP communications can include various packet buffers to temporarily store packets already transferred to another system, such as an end user system, until an acknowledgement is received from the other system. If the acknowledgement is not received, then these stored packets can be resent from the packet buffer. If the acknowledgment is received, then these stored packets can be purged or deleted from the packet buffer.

Overview

Methods, systems, and software are included for handling packet buffering between end users and content servers, such as content delivery nodes. In one example, a method of operating a content delivery node includes generating first packets with first data for a first content request, and storing the first packets in a packet buffer. The method also includes transferring the first packets to a first end user device and deleting the first packets from the packet buffer. The method further provides generating second packets with second data for a second content request and, in response to deleting the first packets, storing the second packets in the packet buffer. The method also includes transferring the second packets to a second end user device and deleting the second packets from the packet buffer. The method also provides monitoring for packet acknowledgments from the first end user device and the second end user device.

In another example, a computer apparatus to operate a content delivery node includes processing instructions to direct a content delivery node to perform the method described above. The apparatus further includes one or more non-transitory computer readable media that store the processing instructions.

In a further instance, a method of operating a content server includes identifying a first content request for a first user device and identifying a second content request for a second user device. The method also includes generating first packets with first data for the first content request and second packets with second data for the second content request. The method further provides storing the first packets in a packet buffer, transferring the first packets to the first user device, and deleting the first packets from the packet buffer. The method additionally includes storing the second packets in the packet buffer in response to deleting the first packets, transferring the second packets to the second user device, and deleting the second packets from the packet buffer. The method also provides monitoring for packet acknowledgments from the first user device and the second user device.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes (CDNs) distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

In many examples of a CDN, multiple network content sources are handled by a single CDN. For example, a CDN can be configured to cache website content of many different websites of many different website content originators. When many different end users request content at the same time or over a similar time period, a CDN can become overloaded and have a slow response for content requests. This overloading can be amplified when multiple end user requests share a single or common packet buffer.

In the present example, systems and methods are included for operating content servers, including content delivery nodes. In one example, a method of operating a content server includes identifying content requests for a first user device and a second user device. Once identified, the content server is configured to generate first packets with data for the first user device, store the first packets in a packet buffer, transfer the packets to the first user device, and delete the first packets from the packet buffer. The content server is further configured to generate second packets with data for the second user device and store the second packets in the packet buffer upon deletion of the first packets. Once stored in the packet buffer, the content server is configured to transfer the second packets to the second user device and delete the second packets from the packet buffer. After transferring the first and second packets, the content server is also configured to monitor for packet acknowledgments from the first and second user devices.

If the content server identifies a packet acknowledgment for one of the devices, then the content server may cease monitoring for an acknowledgment from the device, resulting in the end of the communication of the first or second data packets. However, if the content server fails to identify a packet acknowledgment from one of the devices, the content server may regenerate the appropriate packets, store the packets in the packet buffer, and retransfer the packets to the appropriate device. In some examples, to determine that an acknowledgment has not been received, the server may implement a timeout function. Accordingly, if one of the user devices takes too long to respond, the server will retransfer the appropriate packets.

Figure 1:
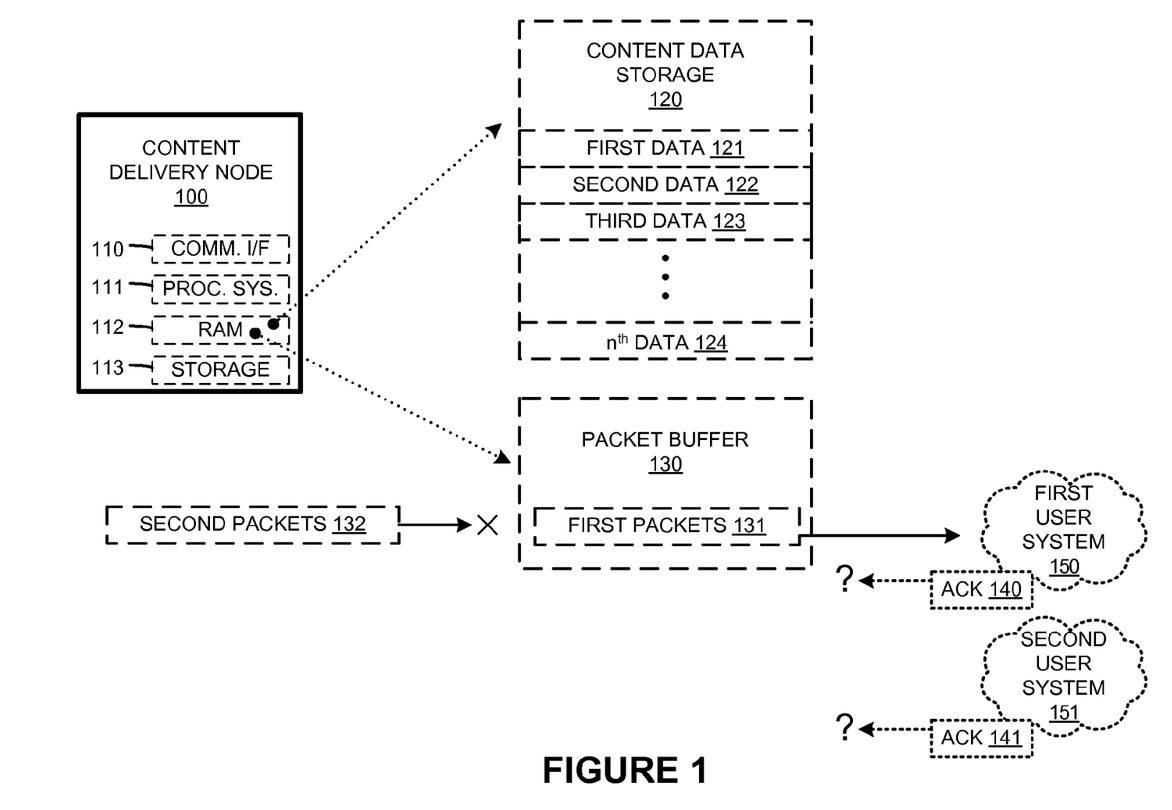
FIG. 1 is a block diagram illustrating a content delivery node.

As a first example, FIG. 1 is provided which illustrates content delivery node (CDN) 100. CDN 100 includes communication interface 110, processing system 111, random access memory (RAM) 112, and storage 113.

In operation, processing system 111 is operatively linked to communication interface 110, RAM 112, and storage 113. Processing system 111 is capable of executing software stored in RAM 112 or storage 113. When executing the software, processing system 111 drives CDN 100 to operate as described herein. CDN 100 can also include other elements, such as user interfaces, computer systems, databases, distributed storage and processing elements, and the like.

Processing system 111 can be implemented within a single processing device but can also be distributed across multiple processing devices or sub-systems that cooperate in executing processing instructions. Examples of processing system 111 include general purpose central processing units, microprocessors, application specific processors, and logic devices, as well as any other type of processing device.

Communication interface 110 includes one or more network interfaces for communicating over communication networks, such as packet networks, the Internet, and the like. The network interfaces can include one or more local or wide area network communication interfaces, which can communicate over Ethernet or Internet protocol (IP) links. Examples of communication interface 110 include network interface card equipment, transceivers, modems, and other communication circuitry.

RAM 112 and storage 113 together can comprise a data storage system. RAM 112 and storage 113 can each comprise any storage media readable by processing system 111 and capable of storing software. RAM 112 can include volatile and nonvolatile, removable and non-removable media implemented in any method or technology for storage of information, such as computer readable instructions, data structures, program modules, or other data. Storage 113 can include non-volatile storage media, such as solid state storage media or flash memory. RAM 112 and storage 113 can each be implemented as a single storage device but can also be implemented across multiple storage devices or subsystems. RAM 112 and storage 113 can each comprise additional elements, such as controllers, capable of communicating with processing system 111. In some implementations, the storage media can be a non-transitory storage media. In some implementations, at least a portion of the storage media can be transitory. It should be understood that in no case are the storage media propagated signals.

Software stored on or in RAM 112 or storage 113 can comprise computer program instructions, firmware, or some other form of machine-readable processing instructions having processes that when executed by processing system 111 direct CDN 100 to operate as described herein. For example, software drives CDN 100 to receive requests for content, determine if the content is stored in CDN 100, retrieve content from origin servers, transfer content to end user devices, manage data storage systems and communication elements for handling, storing, and transferring the content, among other operations. The software can also include user software applications. The software can be implemented as a single application or as multiple applications. In general, the software can, when loaded into processing system 111 and executed, transform processing system 111 from a general-purpose device into a special-purpose device customized as described herein.

In this example, RAM 112 includes content data storage 120 and packet buffer 130. These are separate storage spaces for content data and user packets, respectively. Content data storage 120 can include any data and content which can be requested by an end user or end user device, such as web content, pictures, video, text, and the like. In this example, content data storage 120 includes first data 121, second data 122, and third data 123. Content data storage 120 can include any number of data, as indicated by $n^{th}$ data 124 in FIG. 1. In contrast, packet buffer 130 stores at least a portion of this data for immediate transfer to end user systems after formatting into communication packets, such as TCP packets. Packet buffer 130 temporarily stores communication packets which are to be transferred to another system, such as first user system 150 responsive to a content request or other data request. Packet buffer 130 can comprise a TCP packet buffer. In some examples, one or more portions of content data storage 120 and packet buffer 130 are included in storage 113 of CDN 100. First packets 131 and second packets 132 can comprise TCP packets, or any other packet communications.

Figure 2:
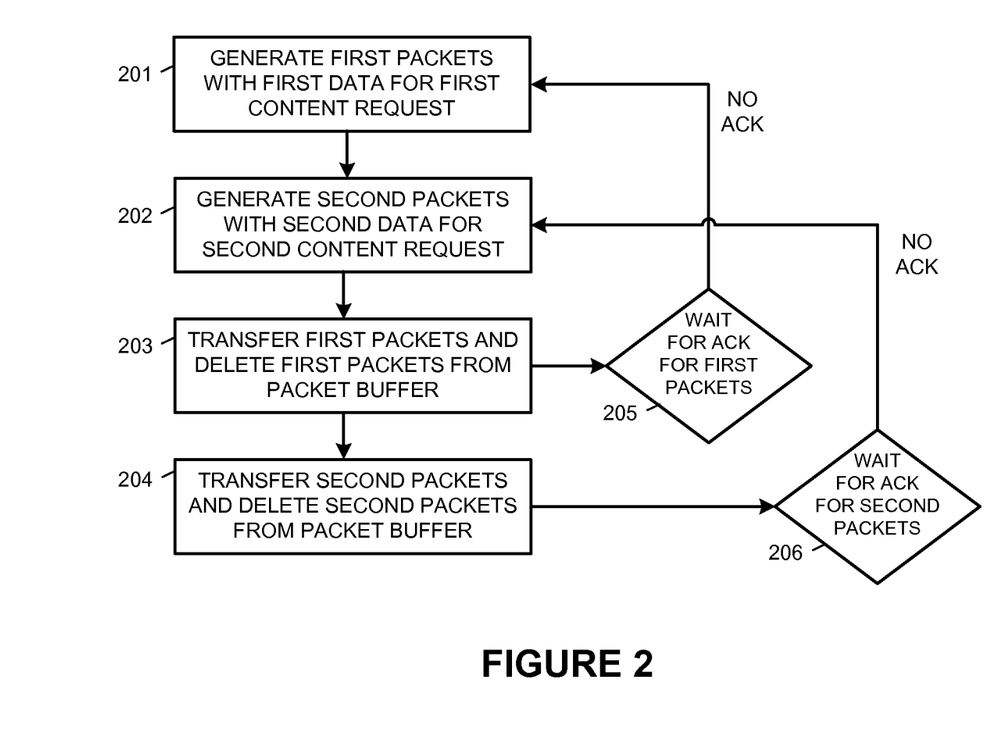
FIG. 2 is a flow diagram illustrating a method of operation of a content delivery node.

FIG. 2 illustrates a flow diagram that describes an example of operation of a content delivery node, such as for CDN 100 of FIG. 1. The operations of FIG. 2 are referenced parenthetically in the description below.

In FIG. 2, CDN 100 generates (201) first packets 131 with first data 121 for a first content request. For example, first user system 150 can request first data 121 from CDN 100. Responsive to this content request, at least a portion of first data 121 can be packetized and transferred to packet buffer 130 as first packets 131. CDN 100 can generate (202) second packets 132 with second data 122 for a second content request. This second content request can proceed concurrently with the first content request, or can occur subsequent to the first content request. For example, second user system 151 can request second data 122 from CDN 100. Responsive to this content request, at least a portion of second data 122 can be packetized as second packets 132. However, in this example, packet buffer 130 only stores packets for a single content request, and first packets 131 are stored in packet buffer 130 before second packets 132.

CDN 100 transfers (203) first packets 131 and deletes first packets 131 from packet buffer 130. In conventional examples, first packets 131 remain in packet buffer 130 until acknowledge message (ACK) 140 is responsively received as transferred by first user system 150. However, in the examples herein, instead of waiting for ACK 140 responsive to first packets 131 being successfully received by first user system 150, CDN 100 deletes first packets 131 responsive to transfer by CDN 100. Thus, CDN 100 transfers first packets 131 for delivery to first user system 150 and responsively purges first packets 131 from packet buffer 130 without regard to ACK 140.

Once CDN 100 purges or deletes first packets 131 from packet buffer 130, then second packets 132 are introduced into packet buffer 130. CDN 100 transfers (204) second packets 132 and deletes second packets 132 from packet buffer 130. Similar to operation 203, instead of waiting for ACK 141 responsive to second packets 132 being successfully received by second user system 151, CDN 100 deletes second packets 132 responsive to transfer by CDN 100. Thus, CDN 100 transfers second packets 132 for delivery to second user system 151 and responsively purges second packets 132 from packet buffer 130 without regard to ACK 141.

In parallel to transferring first packets 131 and second packets 132, CDN 100 also monitors (205, 206) for associated ACK messages from first user system 150 and second user system 151. If CDN 100 receives ACK 140, as transferred by first user system 150, then processing and transfer of first packets 131 completes for the first content request. If ACK 140 is not received by CDN 100, or if ACK 140 is not received by CDN 100 in a predetermined amount of time, then CDN 100 regenerates (201) first packets 131 from first user data 121 and re-transfers (203) first packets 131 for delivery to first user system 150. Likewise, if CDN 100 receives ACK 141, as transferred by second user system 151, then processing/transfer of second packets 132 completes for the second content request. If ACK 141 is not received by CDN 100, or if ACK 141 is not received by CDN 100 in a predetermined amount of time, then CDN 100 regenerates (202) second packets 132 from second user data 122 and re-transfers (204) second packets 132 for delivery to second user system 151.

Advantageously, since CDN 100 does not wait for acknowledgement messages for first packets 131 before purging packet buffer 130 and transferring second packets 132, improved speed and performance can be achieved for transferred second packets 132. If an acknowledgement message is not received or if an acknowledgement message is not received within a predetermined period of time, then these already transferred packets can be regenerated from content data storage 120 and retransferred.

Figure 3:
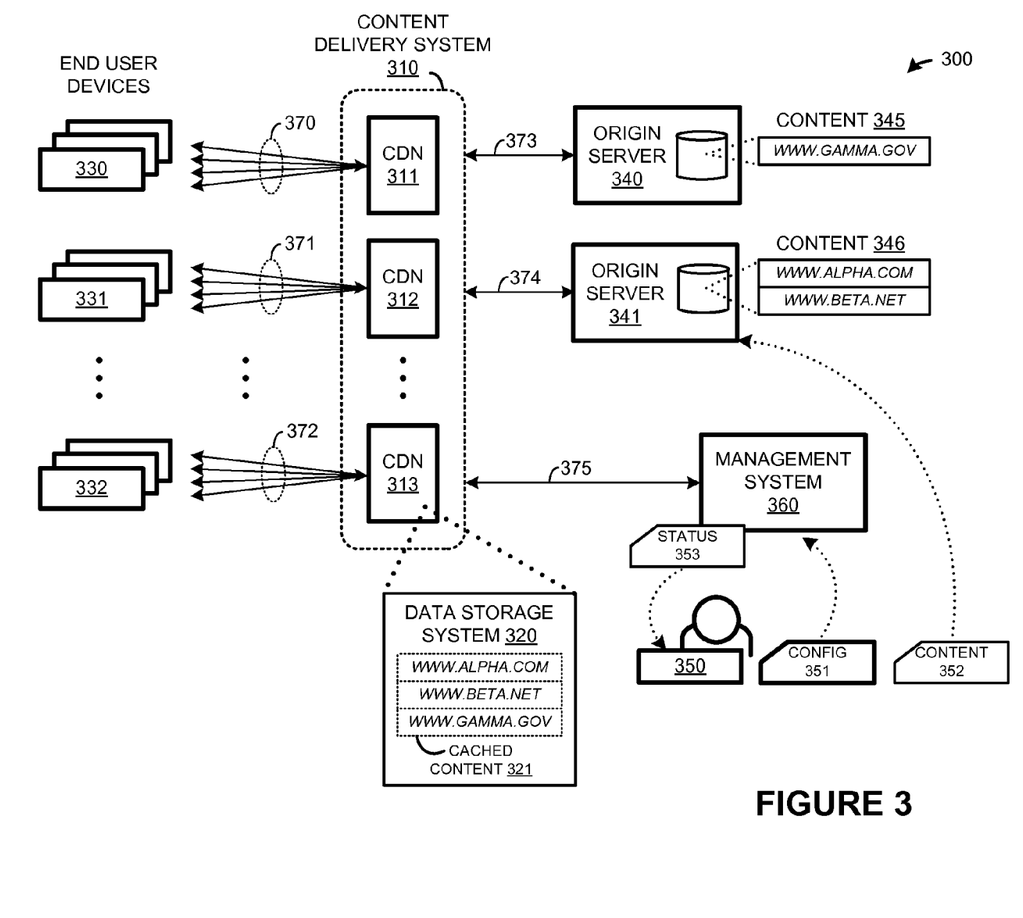
FIG. 3 is a system diagram illustrating a communication system.

As an example employing multiple content delivery nodes in a content delivery system, FIG. 3 is presented. FIG. 3 can include one or more of CDN 100 of FIG. 1, which can handle content requests such as discussed for first user system 150 and second user system 151. FIG. 3 is a system diagram illustrating communication system 300. Communication system 300 includes content delivery system 310, end user devices 330-332 that may represent user systems 150-151, origin servers 340-341, and management system 360. Content delivery system 310 includes one or more content delivery nodes (CDN) 311-313. Each of CDN 311-313 can include one or more data storage systems, such as that illustrated for CDN 313 as data storage system 320. Data storage system 320 can be an example of RAM 112 or storage 113 of CDN 100 in FIG. 1. Data storage system 320 can include content data storage 120 and packet buffer 130 of FIG. 1. End user devices 330-332 are representative of a plurality of end user devices, which can request and receive network content, and any number of end user devices 330-332 can be associated with each of content delivery nodes 311-313. CDN 311-313 and ones of end users 330-332 communicate over associated network links 370-372. Content delivery system 310 and origin servers 340-341 communicate over associated network links 373-374. Content delivery system 310 and management system 360 communicate over link 375. Although not shown in FIG. 3 for clarity, each of CDN 311-313 can also communicate with each other over network links.

To further illustrate FIG. 3, a brief description of the operation of communication system 300 is included. In operation, end user devices 330-332 request network content, such as content 345-346 associated with origin servers 340-341. Instead of these requests being handled by the individual origin servers 340-341, individual content delivery nodes 311-313 of content delivery system 310 receive the content requests over ones of links 370-372 and process the content requests for delivery of the content to the associated end user devices 330-332. Requested network content that is already stored in ones of CDN 311-313 can be provided quickly to the end user devices, while network content that is not already stored in ones of CDN 311-313 can be responsively requested by an associated one of CDN 311-313 from an appropriate origin server 340-341 for delivery by the CDN and possible caching by the CDN. In this manner, each of CDN 311-313 can act as intermediary proxy nodes to provide local and fast access for end user devices 330-332 to network content of origin servers 340-341 without burdening origin servers 340-341. FIG. 3 shows cached content 321 included in data storage system 320 of CDN 313 as comprised of content 345-346, and thus content 345-346 is currently shown as cached by CDN 313. Other configurations are possible, including subsets of content 345-346 being cached in individual ones of CDN 311-313.

Although FIG. 3 shows content 345-346 of origin servers 340-341 being cached by data storage system 320, CDN 311-313 can handle other content. For example, dynamic content generated by activities of end user devices 330-332 need not originally reside on origin servers 340-341, and can be generated due to scripting or code included in web page content delivered by CDN 311-313. This dynamic content can also be cached by ones of CDN 311-313, and can be specific to a particular end user device during a communication session.

Management system 360 handles configuration changes and status information collection and delivery for system operators and for the origin server operators or managers. For example, operator device 350 can transfer configuration 351 for delivery to management system 360, where configuration 351 can alter the handling of network content requests by CDN 311-313, among other operations. Also, management system 360 can monitor status information for the operation of CDN 311-313, such as operational statistics, and provide this status information as 353 to operator device 350. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

Referring back to the elements of FIG. 3, CDN 311-313, origin servers 340-341, and management system 360 can each include communication interfaces, network interfaces, processing systems, computer systems, microprocessors, storage systems, storage media, or some other processing devices or software systems, and can be distributed among multiple devices. Examples of CDN 311-313, origin servers 340-341, and management system 360 can each include software such as an operating system, logs, databases, utilities, drivers, caching software, networking software, and other software stored on a computer-readable medium. Content delivery system 310, in addition to including CDN 311-313, can include equipment and links to route communications between CDN 311-313 and any of end user devices 330-332, origin servers 340-341, and management system 360, among other operations.

End user devices 330-332 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 370-375 each use metal, glass, optical, air, space, or some other material as the transport media. Communication links 370-375 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 370-375 can each be a direct link or can include intermediate networks, systems, or devices, and can include a logical network link transported over multiple physical links. Although one main link for each of links 370-375 is shown in FIG. 3, it should be understood that links 370-375 are merely illustrative to show communication modes or access pathways. In other examples, further links can be shown, with portions of the further links shared and used for different communication sessions or different content types, among other configurations. Communication links 370-375 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4:
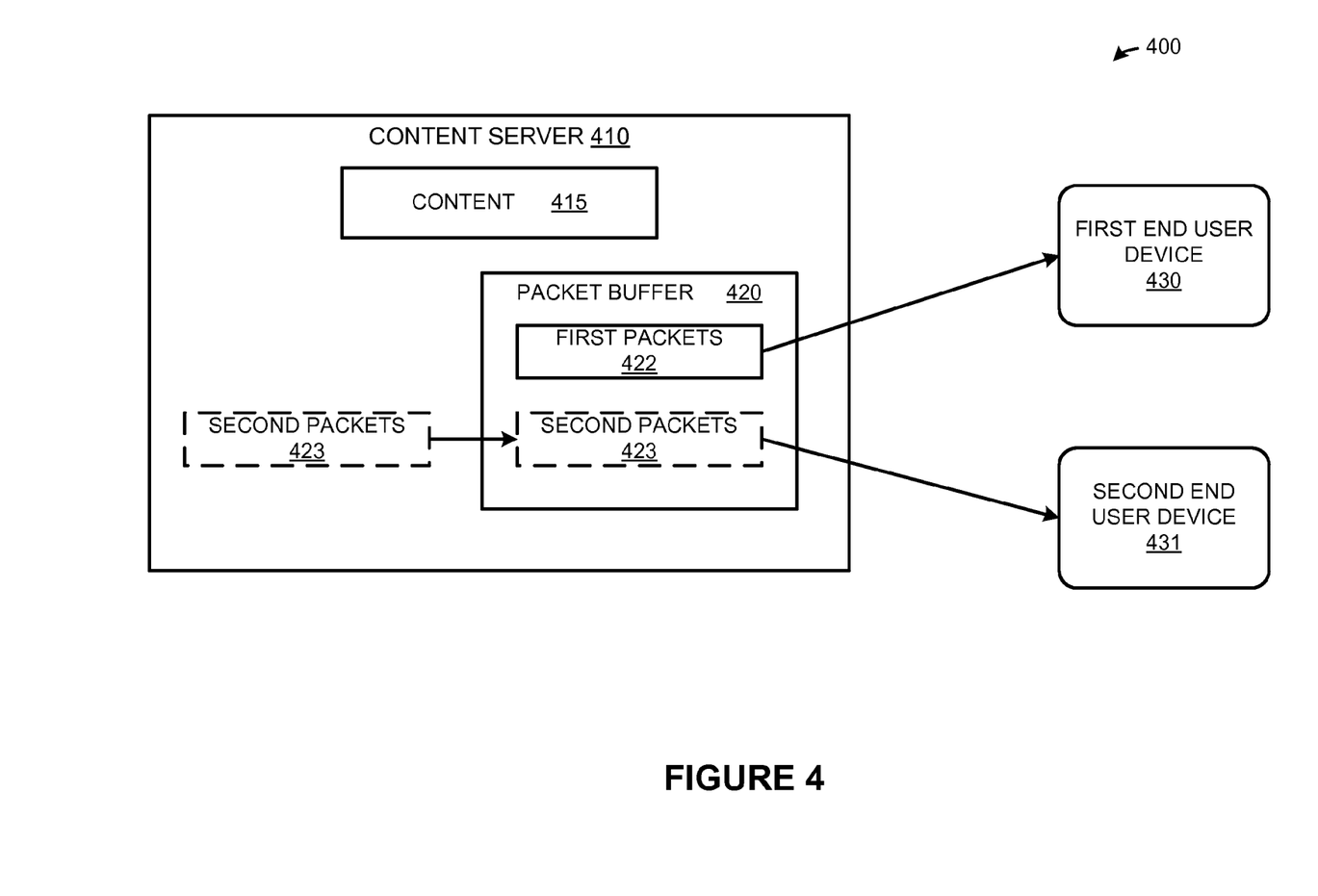
FIG. 4 is a block diagram illustrating an overview of operating a content server.

Although the packet buffer operations have been discussed in the previous examples with respect to a content delivery node, it should be understood that the packet buffer operations might be employed in any content server, such as origin server or other similar device. Referring to FIG. 4, FIG. 4 is a block diagram 400 illustrating the operation of a content server 410 according to once example. Content server 410 is configured to operate similar to the content delivery nodes described in FIGS. 1-3 and provides various content or data to end user devices. As illustrated in FIG. 4, content server 410 further includes content 415 and packet buffer 420. FIG. 4 further includes first end user device 430 and second end user device 431, which are examples of user systems 150-151.

In operation, first end user device 430 and second end user device 431 are configured to request and receive content from content server 410. Such content may include text, hypertext markup language (HTML) pages, pictures, video, audio, animations, code, scripts, or other content viewable by an end user in a browser or other application. Upon identification of a content request, such as a content request from first end user device 430, content server 410 is configured to identify the requested content data and generate first packets 422 for the content data. Once the first packets are generated and placed in packet buffer 420, first packets 422 are transferred to the appropriate end user device that requested the content and the packets are promptly deleted from packet buffer 420.

After or during the generation of first packets 422, second packets 423 can be generated to facilitate a content request for second end user device 431. These second packets are configured to wait until first packets 422 are deleted from packet buffer before they are placed in the packet buffer. Once in the buffer, second packets 423 are transferred to second end user device 431 and are deleted from packet buffer 420.

Once the first and second packets are transferred to the corresponding devices, content server 410 is further configured to monitor for acknowledgments from the devices indicating that they received the data. If an acknowledgment is received, then packet communication is complete and it will no longer monitor for an acknowledgment. For example, once first packets 422 are delivered to first end user device 430, content server 410 is configured to monitor for an acknowledgment from first end user device 430. Once an acknowledgment is received from first end user device 430, content server 410 will no longer monitor for an acknowledgment from the first device.

In contrast, if content server 410 receives no acknowledgment, then the packets may be regenerated, placed in packet buffer 420, and retransferred to the corresponding device. Returning to the example of transferring first packets 422, if first end user device 430 never transfers an acknowledgment, first packets 422 will be regenerated, placed in packet buffer 420, and retransferred to first end user device 430. Once retransferred, the first packets may be deleted from packet buffer 420, and content server 410 may again monitor for an acknowledgment. In some examples, content server 410 may determine that no acknowledgment is sent based on a time out mechanism. Thus, if an end user device does not acknowledge within a certain period of time, content server 410 may retransfer the requested packets.

Figure 5:
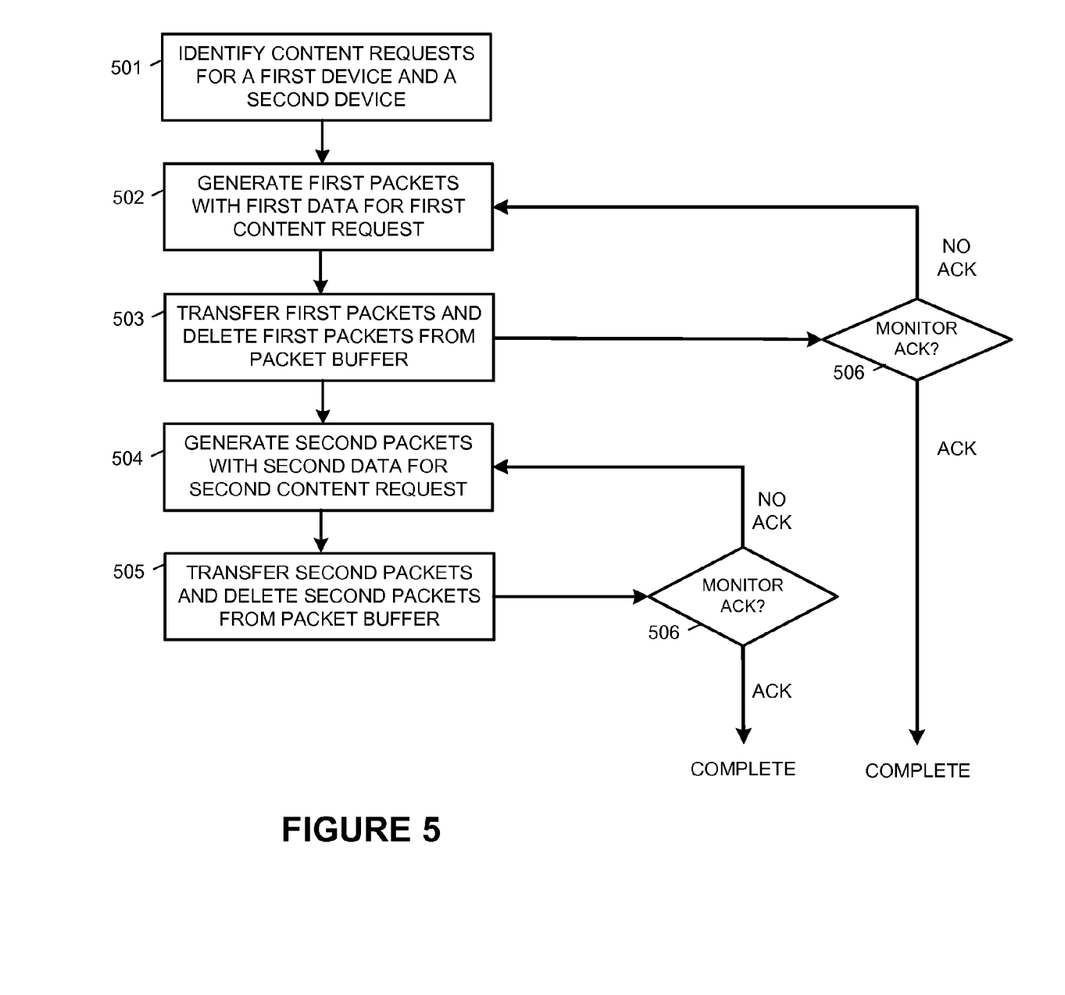
FIG. 5 is a flow diagram illustrating the operation of a content server.

To further illustrate the operation of content server 410, FIG. 5 is included. FIG. 5 is a flow diagram illustrating the operation of a content server to transfer data packets to a plurality of end user devices. As demonstrated, the content server first identifies (501) content requests for a first user device and a second user device. Based on these requests, the content server is configured to generate (502) first packets with first data for the first content request, and place the first packets into a packet buffer. Once placed in the packet buffer, the first packets are transferred (503) to the first user device and deleted from the packet buffer.

At the same time or following the transfer of the first packets, second packets are generated (504) with second data for the second data request. Upon generation and after the deletion of the first packets from the packet buffer, the second packets are stored in the packet buffer to be transferred to the second user device. Once in the packet buffer, the content server is configured to transfer (505) the second packets to the second user device and delete the second packets from the packet buffer. Further, in parallel to transferring each of the packets to the corresponding device, the content server is configured to monitor (506) for acknowledgments from the first and second user devices.

Referring to the first packets transferred, the content server is configured to identify if there is a first packet acknowledgment (ACK) from the first user device. If there is an acknowledgment, then the content server is configured to terminate the packet communication process for the first packets. In some examples, to terminate the process, the content server is configured to terminate monitoring for the acknowledgment from the first user device.

In contrast to receiving an acknowledgment, the content server is also configured to identify if there is a lack of acknowledgment, which may be based on a timeout process. Once the timeout threshold is attained, the content server is configured to regenerate the first packets, place the packets in the packet buffer, and retransfer the packets to the first user device. In response to transferring the packets, the content server may delete the packets and return to monitoring for an acknowledgement.

During the process of identifying a first packet acknowledgment, the content server is further configured to identify a second packet acknowledgment for the second user device. Based on the acknowledgment or lack of acknowledgment, the content server is configured to manage the second packets in the same way as the first. For instance, if an acknowledgment is received, then the content server is configured to terminate monitoring for the second packet acknowledgment. If, however, a content acknowledgment is not received for the second packets, then the content server is configured to regenerate the second packets, store the second packets in the packet buffer, and retransfer the second packets to the second user device. In some examples, once retransferred the second packets may again be deleted from the packet buffer.

Figure 6:
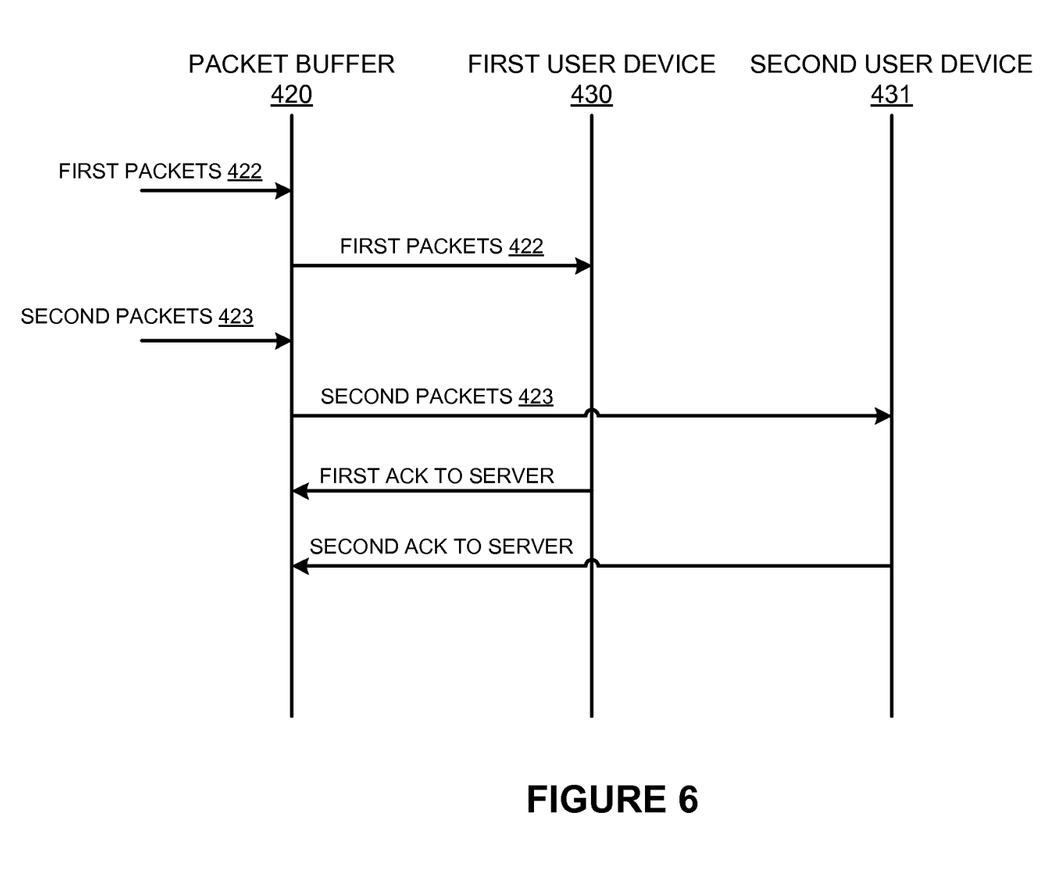
FIG. 6 is a timing diagram illustrating the operation of a content server.

Referring now to FIG. 6, FIG. 6 is a timing diagram illustrating the operation of content server 410 according to one example. As illustrated, first packets 422 are generated to provide data for a first content request, and are stored in packet buffer 420. Once stored, content server 410 transfers first packets 422 to first user device 430.

In response to the transfer, first packets 422 are deleted from packet buffer 420, and second packets 423 are stored in packet buffer 420. These second packets are generated to provide data for a second content request to another user device. Upon storage in packet buffer 420, content server 410 is configured to transfer second packets 423 to second user device 431, and promptly delete second packets 423 from packet buffer 420.

Following the packet transfers, content server 410 is configured to monitor for packet acknowledgments from first user device 430 and second user device 431. By promptly deleting the transferred packets from packet buffer 420 after the packets are transferred, delay is reduced in waiting for an acknowledgment for a previous transfer. For example, if first user device 430 had a delayed acknowledgment, the transfer of second packets 423 could also be delayed waiting for the acknowledgment. In the present instance, rather than saving the transferred packets, the packets are promptly deleted. Accordingly, second packets 423 may be transferred to second user device 431 prior to receiving a packet acknowledgment from first user device 430. If a packet acknowledgment were not received from first user device 430, content server 410 may regenerate first packets 422 and retransfer the packets following the transfer to second user device 431.

Although illustrated in the present example as having the first acknowledgment received before the second acknowledgment, it should be understood that the acknowledgments may be received in any order by content server 410. For instance, the acknowledgment from second user device 431 may arrive at content server 410 before an acknowledgment from first user device 430. Further, although illustrated with two packet transfers in the present example it should be understood that processes described herein might be implemented with any number of packet transfers to any number of user devices.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a content delivery node, the method comprising:

identifying a first content request from a first end user device for first data originating from an origin server, the first data cached by the content delivery node in memory;

identifying a second content request from a second end user device for second data originating from the origin server and cached by the content delivery node in memory;

generating first packets comprising the first data for the first content request;

storing the first packets in a packet buffer of the content delivery node;

transferring the first packets from the packet buffer to the first end user device and deleting the first packets from the packet buffer without regard to receiving a packet acknowledgment from the first end user device;

generating second packets comprising the second data for the second content request;

in response to deleting the first packets, storing the second packets in the packet buffer;

transferring the second packets from the packet buffer to the second end user device and deleting the second packets from the packet buffer without regard to receiving a packet acknowledgment from the second end user device; and monitoring for the packet acknowledgments from the first end user device and the second end user device.

2. The method of claim 1 further comprising:

identifying the packet acknowledgment from one of the first end user device or the second end user device; and completing transfer of the first packets or transfer of the second packets based on the packet acknowledgment.

3. The method of claim 2 wherein completing transfer of the first packets or transfer of the second packets based on the packet acknowledgment comprises terminating monitoring for the packet acknowledgment from the first end user device or the second end user device.

4. The method of claim 1 further comprising:

identifying that the packet acknowledgment is not received from the first end user device;

in response to identifying that the packet acknowledgment is not received, regenerating the first packets and storing the first packets in the packet buffer; and responsive to storing the first packets in the packet buffer, transferring the first packets to the first end user device and deleting the first packets from the packet buffer.

5. The method of claim 4 wherein identifying that the packet acknowledgment is not received from the first end user device comprises identifying a timeout for receiving the packet acknowledgement from the first end user device.

6. The method of claim 1 further comprising:

identifying that the packet acknowledgment is not received from the second end user device;

in response to identifying that the packet acknowledgment is not received, regenerating the second packets and storing the regenerated second packets in the packet buffer; and responsive to storing the regenerated second packets in the packet buffer, transferring the regenerated second packets to the second end user device and deleting the regenerated second packets from the packet buffer.

7. The method of claim 6 wherein identifying that the packet acknowledgment is not received from the second end user device comprises identifying a timeout for receiving the packet acknowledgment from the second end user device.

8. The method of claim 1 wherein generating the second packets occurs subsequently to generating the first packets.

9. The method of claim 1 wherein generating the second packets occurs concurrently with generating the first packets.

10. A computer apparatus to operate a content delivery node, the computer apparatus comprising:

processing instructions that direct the content delivery node, when executed by the content delivery node, to:

identify a first content request from a first end user device for first data originating from an origin server, the first data cached by the content delivery node in memory;

identify a second content request from a second end user device for second data originating from the origin server and cached by the content delivery node in memory;

generate first packets comprising the first data for the first content request;

store the first packets in a packet buffer of the content delivery node;

transfer the first packets to the first end user device from the packet buffer and delete the first packets from the packet buffer without regard to receiving a packet acknowledgment from the first end user device;

generate second packets comprising the second data for the second content request;

in response to deleting the first packets, store the second packets in the packet buffer;

transfer the second packets to the second end user device from the packet buffer and delete the second packets from the packet buffer without regard to receiving a packet acknowledgment from the second end user device; and monitor for the packet acknowledgments from the first end user device and the second end user device; and one or more non-transitory computer readable media that store the processing instructions.

11. The computer apparatus of claim 10 wherein the processing instructions further direct the content delivery node to:

identify the packet acknowledgment from one of the first end user device or the second end user device; and complete transfer of the first packets or transfer of the second packets based on the packet acknowledgment.

12. The computer apparatus of claim 11 wherein the processing instructions to complete transfer of the first packets or transfer of the second packets based on the packet acknowledgment direct the content delivery node to terminate monitoring for the packet acknowledgment from the first end user device or the second end user device.

13. The computer apparatus of claim 10 wherein the processing instructions further direct the content delivery node to:

identify that the packet acknowledgment is not received from the first end user device;

in response to identifying that the packet acknowledgment is not received, regenerate the first packets and store the first packets in the packet buffer; and responsive to storing the first packets in the packet buffer, transfer the first packets to the first end user device and delete the first packets from the packet buffer.

14. The computer apparatus of claim 13 wherein the processing instructions to identify that the packet acknowledgment is not received from the first end user device direct the content delivery node to identify a timeout for receiving the packet acknowledgment from the first end user device.

15. The computer apparatus of claim 10 wherein the processing instructions further direct the content delivery node to:

identify that the packet acknowledgment is not received from the second end user device;

in response to identifying that the packet acknowledgment is not received, regenerate the second packets and store the regenerated second packets in the packet buffer; and responsive to storing the regenerated second packets in the packet buffer, transfer the regenerated second packets to the second end user device and delete the regenerated second packets from the packet buffer.

16. The computer apparatus of claim 15 wherein the processing instructions to identify that the packet acknowledgment is not received from the second end user device direct the content delivery node to identify a timeout for receiving the packet acknowledgment from the second end user device.

17. The computer apparatus of claim 10 wherein the processing instructions to generate the second packets direct the content delivery node to generate the second packets subsequently to generating the first packets.

18. The computer apparatus of claim 10 wherein the processing instructions to generate the second packets direct the content delivery node to generate the second packets concurrently with generating the first packets.

19. A method of operating a content delivery mode to facilitate content requests, the method comprising:
  identifying a first content request from a first end user device for first data originating from an origin server, the first data cached by the content delivery node in memory;
  identifying a second content request from a second end user device for second data originating from the origin server and cached by the content delivery node in memory;
  generating first packets comprising the first data for the first content request and second packets comprising the second data for the second content request;
  storing the first packets in a packet buffer of the content delivery node;
  transferring the first packets from the packet buffer to the first user device and deleting the first packets from the packet buffer without regard to receiving a packet acknowledgment from the first end user device;
  in response to deleting the first packets, storing the second packets in the packet buffer;
  transferring the second packets from the packet buffer to the second user device and deleting the second packets from the packet buffer without regard to receiving a packet acknowledgment from the second end user device; and
  monitoring for the packet acknowledgments from the first user device and the second user device.

20. The method of claim 19 further comprising:
  identifying that the packet acknowledgment is missing from one of the first user device or the second user device based on a timeout for the packet acknowledgment.

* * * * *